Jan. 19, 1954
G. MURRAY
2,666,554
CONDIMENT DISTRIBUTER
Filed May 3, 1950
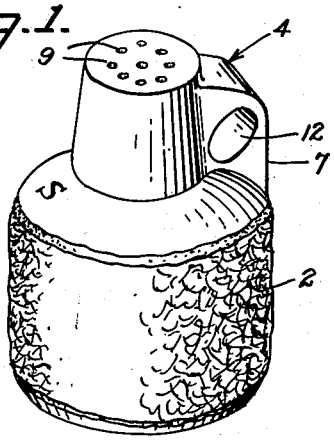
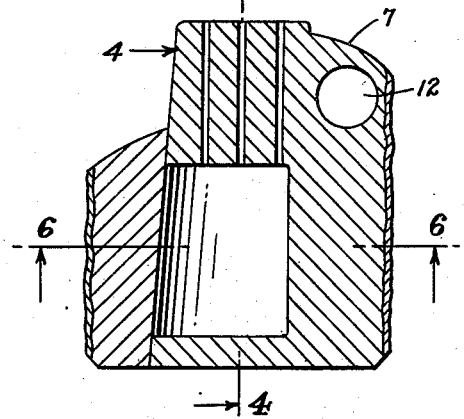
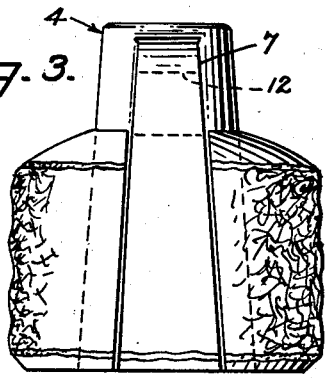
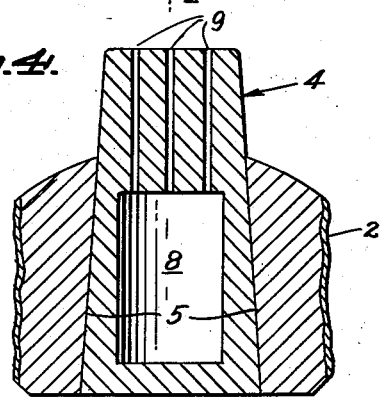
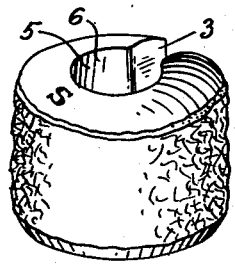
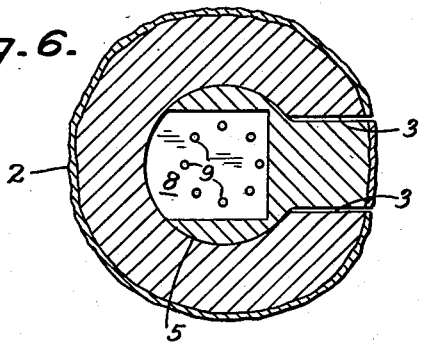
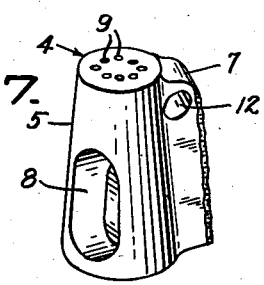
INVENTOR.
GEORGE MURRAY
BY
Townsend and Townsend
ATTORNEYS Patented Jan. 19, 1954

2,666,554

UNITED STATES PATENT OFFICE 2,666,554

CONDIMENT DISTRIBUTER

George Murray, Eureka, Calif.

Application May 3, 1950, Serial No. 159,816

7 Claims. (Cl. 222—183)

This invention relates to condiment holders, and, more particularly, to new and useful improvements in distributers for condiments, such as salt and pepper.

One of the principal objects of the present invention is to provide a salt or pepper shaker of novel design and wherein a base member coacts with a removable dispensing receptacle in a fashion which enables easy dissociation of the respective parts so that the dispensing receptacle may be filled and refilled with a minimum of effort.

Another object is to provide a condiment distributer, which is designed to enable easy filling thereof from a conventional commercial condiment container, it being borne in mind that the usual commercial condiment containers are provided with relatively large dispensing spouts.

A further object of the invention is to provide a condiment distributer formed of two parts which engage one another frictionally and which are arranged so that undesirable displacement of the parts with respect to one another is minimized.

Further objects and advantages of the present invention will become apparent upon reading the following specification and referring to the accompanying drawings in which similar characters of reference represent corresponding parts in each of the several views.

Referring to the drawings:

Fig. 1 is a perspective view of the distributer.

Fig. 2 is a vertical sectional view of the distributer, taken through the handle.

Fig. 3 is a rear elevational view of the distributer.

Fig. 4 is a sectional view, taken on line 4—4 of Fig. 2.

Fig. 5 is a perspective view of the base member.

Fig. 6 is a sectional view, taken on line 6—6 of Fig. 2.

Fig. 7 is a perspective view of the receptacle member.

As illustrated in the drawings, the distributer is formed of wood and the outer perimeter thereof may still carry its natural bark in order to give a rustic woodcraft appearance thereto. Obviously, the distributer may be formed of materials other than wood, such as metal, plastic, or the like.

The device consists essentially of a hollow base member 2, having a slot 3 extending from top to bottom thereof. Disposed within the base member is a receptacle, indicated generally at 4, which is tapered throughout its length, as at 5, in conformity with the hollow interior 6 of the base member.

A handle portion 7 is disposed slidably in the slot 3 and both the slot and the handle are tapered correspondingly. In this connection the taper of the handle and the said receptacle member 4 is the same and corresponds with the taper of the hollow interior 6 and slot 3 of the base member whereby, when the receptacle and handle integral therewith are inserted into the supporting base member from the bottom thereof, the receptacle is wedged in the base so that when the distributer is used to dispense a condiment there is no displacement of the parts relative to one another.

The receptacle 4 is provided with a hollow chamber 8, open to the tapered wall 5 of the receptacle, into which the condiment to be distributed is placed. A plurality of dispensing orifices 9 are provided in the receptacle which enable flow of the particles of condiment from chamber 8 through the apertures 9, and which said orifices 9 communicate with atmosphere at the top of the receptacle 4. The receptacle 4 preferably projects above the top of the base 2 and a hole 12 is provided in the handle 7 to serve as a fingerhold in order to facilitate use of the distributer.

As illustrated, the bottom of the receptacle and the bottom of the base are flush with one another, but it may be desirable that the two not be flush. For example, the bottom of the receptacle may be inserted within the base member so that the weight of the distributer is supported solely by the bottom of the said base.

In order to utilize the present invention, the distributer is grasped by the fingerhold, formed by the hole 12, inverted, and the condiment is then dispensed from chamber 8 through apertures 9 by action of gravity. In order to refill the receptacle 4, the same is removed from the base by slidable relative movement of the receptacle relative to the base from the bottom of the base. Salt or other condiment is then poured into the chamber 8, which has a comparatively large opening, and, when filled, the receptacle is inserted slidably into the base from the bottom thereof and wedged frictionally therein so that the filling opening of chamber 8 is enclosed and covered by the base.

The present invention lends itself to distributers having the appearance of handcraft and, as previously noted, may be formed of wood having natural bark in order to lend an artistic rustic appearance. The distributer unit is excellent from the point of view of condiment dispensing and facility in refilling the unit.

While the invention has been described in rather specific detail by way of illustration and example of use and design for purposes of clarity of understanding, it is understood that changes in structure, design and use are contemplated and may be practiced within the spirit of the invention and the scope of the appended claims.

I claim:

1. A condiment distributer comprising the combination of a hollow base member and receptacle member having an open condiment chamber, said receptacle member wedged slidably in said base member, said base member surrounding a portion of said receptacle member and enclosing the open condiment chamber thereof, said receptacle member having dispensing apertures therein in communication with said condiment chamber and extending to one end of said receptacle member remote from said base member and communicating to atmosphere.

2. A condiment distributer according to claim 1 and wherein the hollow portion of said base is tapered from bottom to top and said receptacle is tapered correspondingly whereby when said receptacle is disposed slidably in said base said receptacle is wedged therein to prevent movement of said base and receptacle relative to one another in one direction but not in another direction.

3. A condiment distributer according to claim 1 and wherein the hollow portion of said base is tapered from bottom to top and said receptacle is tapered correspondingly whereby when said receptacle is disposed slidably in said base said receptacle is wedged therein to prevent movement of said base and receptacle relative to one another in one direction but not in another direction, and said receptacle is provided with a handle a portion of which is disposed above the top of said base member.

4. A distributer for condiments, comprising a hollow base member having a tapered slot through the walls thereof, a receptacle member slidably positioned within said hollow base member, the exterior of said receptacle and the interior of said base being tapered correspondingly so that the receptacle is wedged in said base to prevent movement of the receptacle relative to the base in one direction while not in the opposite direction, said receptacle member having a hollow condiment receiving chamber formed therein adjacent one end thereof, and with dispensing apertures communicating with said condiment chamber and atmosphere, and wherein said receptacle member is provided with a handle member tapered correspondingly to the walls of said base member whereby the handle member is positioned slidably in said slot and engaged frictionally by the walls thereof.

5. A condiment distributor comprising an annular base having a tapered bore and a receptacle member having a complementary external taper arranged to nest within said base, said receptacle member being provided with a chamber and a dispensing aperture communicating between said chamber and one end of said receptacle member, said receptacle member being removable from said base by movement in a direction toward the thick end of said receptacle member.

6. A distributor according to claim 5 in which said receptacle member is formed with an enlarged aperture extending from a portion of the external tapered surface into said chamber, said aperture being closed when said receptacle member is nested in said base.

7. A distributor according to claim 5 in which said base is provided with a slot tapered in correspondence with the taper of its bore and said receptacle member is provided with a handle tapered correspondingly to the walls of said base and substantially filling said slot when said receptacle member and base are nested.

GEORGE MURRAY.

References Cited in the file of this patent

UNITED STATES PATENTS

| Number | Name | Date |
| --- | --- | --- |
| 752,586 | Pitts | Feb. 16, 1904 |
| 2,028,870 | Jennings | Jan. 28, 1936 |
| 2,228,435 | Binon | Jan. 14, 1941 |